(12) United States Patent
Suzuki et al.

(10) Patent No.: US 7,542,075 B2
(45) Date of Patent: Jun. 2, 2009

(54) EXTENDED DIGITAL DATA-PATH STRUCTURE USING SUB LSBS

(75) Inventors: Toshiki Suzuki, Tokyo (JP); Toshinori Otaka, Chiba (JP)

(73) Assignee: Aptina Imaging Corporation, Grand Cayman (KY)

( * ) Notice: Subject to any disclaimer, the term of this patent is extended or adjusted under 35 U.S.C. 154(b) by 801 days.

(21) Appl. No.: 11/209,760

(22) Filed: Aug. 24, 2005

(65) Prior Publication Data

US 2007/0040915 A1 Feb. 22, 2007

(30) Foreign Application Priority Data

Aug. 19, 2005 (JP) ............... 2005-239020

(51) Int. Cl.
*H04N 5/228* (2006.01)
*H04B 1/66* (2006.01)

(52) U.S. Cl. ............... 348/222.1; 375/240; 375/240.26
(58) Field of Classification Search .............. 348/222.1; 375/240–241

See application file for complete search history.

(56) References Cited

U.S. PATENT DOCUMENTS

| | | | | |
|---|---|---|---|---|
| 5,142,380 A | * | 8/1992 | Sakagami et al. | 382/250 |
| 7,230,986 B2 | * | 6/2007 | Wise et al. | 375/240.26 |
| 7,234,031 B2 | * | 6/2007 | Yim et al. | 711/154 |
| 2006/0230250 A1 | * | 10/2006 | Klint et al. | 711/200 |

OTHER PUBLICATIONS

Zhou, Z, *Frame-Transfer CMOS Active Pixel Sensor with Pixel Binning*, IEEE Electronic Devices, Oct. 1977, pp. 1764-1768.

* cited by examiner

*Primary Examiner*—David L Ometz
*Assistant Examiner*—Pritham Prabhakher
(74) *Attorney, Agent, or Firm*—Dickstein Shapiro LLP (57) ABSTRACT

An imager device having a varied bus bit width in the image processing data-path. The imager device has a high accuracy output irrespective of digital gain value. The imager device can be adopted for all sensors that have column fixed pattern noise correction and digital gain in their data-path block.

28 Claims, 8 Drawing Sheets

|  | \multicolumn{4}{c}{Xmin AT "COLUMN FPN CALIBRATION" (MINIMUM NUMBER OF SAMPLING)} |
| --- | --- | --- | --- | --- |
|  | 4 | 16 | 64 | 256 |
| 2X | M=1+C | M=1+C | M=1+C | M=1+C |
| 4X | — | M=2+C | M=2+C | M=2+C |
| 8X | — | — | M=3+C | M=3+C |
| 16X | — | — | — | M=4+C |

Gmax at "DIGITAL GAIN" (MAXIMUM GAIN)

EXTENDED DIGITAL DATA-PATH STRUCTURE USING SUB LSBS

FIELD OF THE INVENTION

The invention relates to improved semiconductor imaging devices and, in particular, to imagers having improved image quality.

BACKGROUND OF THE INVENTION

The semiconductor industry currently uses different types of semiconductor-based imagers, such as charge coupled devices (CCDs), complementary metal oxide semiconductor (CMOS) devices, photodiode arrays, charge injection devices and hybrid focal plane arrays, among others.

Solid-state image sensors, also known as imagers, were developed in the late 1960s and early 1970s primarily for television image acquisition, transmission, and display. An imager absorbs incident radiation of a particular wavelength (such as optical photons, x-rays, or the like) and generates an electrical signal corresponding to the absorbed radiation. There are a number of different types of semiconductor-based imagers, including CCDs, photodiode arrays, charge injection devices (CIDs), hybrid focal plane arrays, and CMOS imagers. Current applications of solid-state imagers include cameras, scanners, machine vision systems, vehicle navigation systems, video telephones, computer input devices, surveillance systems, auto focus systems, star trackers, motion detector systems, image stabilization systems and other image based systems.

These imagers typically consist of an array of pixel cells containing photosensors, where each pixel cell produces a signal corresponding to the intensity of light impinging on that element when an image is focused on the array. These signals may then be used, for example, to display a corresponding image on a monitor or otherwise used to provide information about the optical image. The photosensors are typically photogates, phototransistors, photoconductors or photodiodes, where the conductivity of the photosensor or the charge stored in a diffusion region corresponds to the intensity of light impinging on the photosensor. The magnitude of the signal produced by each pixel cell, therefore, is proportional to the amount of light impinging on the photosensor.

CMOS active pixel sensor (APS) imaging devices are known in the art. These imaging devices include an array of pixel cells, arranged in rows and columns, that convert light energy into electric signals. Each pixel cell includes a photodetector and one or more active transistors. The transistors typically provide amplification, read-out control and reset control, in addition to producing the electric signal output from the cell.

While CCD technology has a widespread use, CMOS imagers are being increasingly used as low cost imaging devices. A fully compatible CMOS sensor technology enabling a higher level of integration of an image array with associated processing circuits is beneficial to many digital imager applications.

A CMOS imager circuit includes a focal plane array of pixel cells, each one of the cells including a photoconversion device, for example, a photogate, photoconductor, phototransistor, or a photodiode for accumulating photo-generated charge in a portion of the substrate. A readout circuit is connected to each pixel cell and includes at least an output transistor, which receives photogenerated charges from a doped diffusion region and produces an output signal that is periodically read out through a pixel access transistor. The imager may optionally include a transistor for transferring charge from the photoconversion device to the diffusion region or the diffusion region may be directly connected to or part of the photoconversion device. A transistor is also typically provided for resetting the diffusion region to a predetermined charge level before it receives the photoconverted charges.

In a CMOS imager, the active elements of a pixel cell perform the necessary functions of: (1) photon to charge conversion; (2) accumulation of image charge; (3) transfer of charge to a floating diffusion region accompanied by charge amplification; (4) resetting the floating diffusion region to a known state; (5) selection of a pixel for readout; and (6) output and amplification of a signal representing pixel cell charge. Photo-charge may be amplified when it moves from the initial charge accumulation region to the floating diffusion region. The charge at the floating diffusion region is typically converted to an output voltage by a source follower output transistor.

Figure 1:
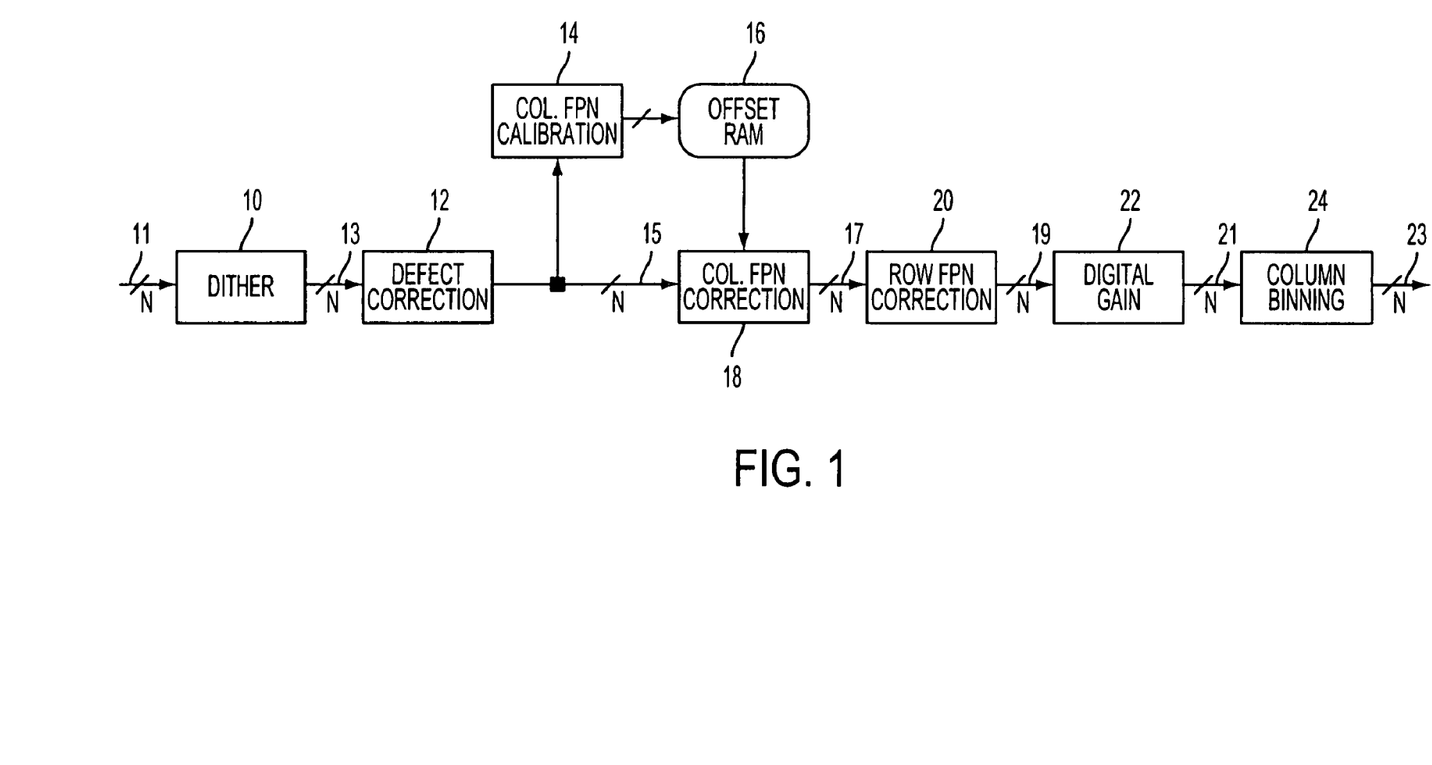
FIG. 1 illustrates a schematic illustration of a conventional image processing data-path.

A digital-output CMOS imager has a number of analog-to-digital converters (ADC) which digitize the data pixels put out through above functions (1)-(6). Generally, such CMOS imagers have digital data-path following ADC for noise reduction, black level compensation, various formatted output and so on. The data-path for image processing of a conventional image sensor device is shown in FIG. 1. In the conventional image sensor device, each functional block in the image processing data-path communicates over a bus with a fixed-bit bus width. The data is processed from left to right, keeping an N-bit data width, with "N" being defined by the resolution of the analog-to-digital converter (ADC) used in the image sensor device. For example, an image sensor using a 12-bit ADC has a 12-bit bus width (i.e., N=12).

As can be seen from FIG. 1, after analog-to-digital conversion, digital data is received over an N-bit wide data path 11 and the image is dithered at processing block 10. Dithering, also called halftoning or color reduction, is a well known process of rendering an image on a display device with fewer colors than are in the images. The number of different colors in an image or on a device used to display the image is called color resolution. Dithering scatters different colored pixels in an image to make it appear as though there are intermediate colors in images with a limited color palette.

The data is then forwarded to a defect correction processing block 12 over an N-bit wide data path 13 where any defects in the image data are corrected. Defect correction is the process of substituting pixel defects (i.e., single dark or bright pixels) with neighboring pixel data to correct any defects in the pixel data.

The data is sent over another N-bit wide path 15. Any column fixed pattern noise in the data is compared to column fixed pattern calibration values 14, which have been stored in an offset RAM 16, at the column fixed pattern noise correction processing block 18. The data is then sent to the row fixed pattern noise correction processing block 20 over an N-bit wide data path 17. The data is then sent to the digital gain processing block 22 over another N-bit wide path 19.

After digital gain is applied to the data, the data is next sent to a column binning processing block 24 over an N-bit wide data path 21. Binning is the accumulation or interpolation of the charge of multiple pixels and reading them out in a single operation. By incorporating binning into the readout circuitry, various sub-resolution processes can be implemented to minimize aliasing effects. The binning operation can be done using any suitable techniques, including but not limited to the operations described in Zhou, Z., *Frame-Transfer CMOS Active Pixel Sensor with Pixel Binning*, IEEE Electronic Devices, October 1997, pp. 1764-68, incorporated herein by reference. Finally, the data is output over an N-bit wide data path 23.

Due in part to the fixed bus width throughout the image processing data-path, the image sensor device using above structure will incur computation errors in the image processing. Because of the fixed bit bus width, the data needs to be truncated and the fractional part of the data that is generated from the image sensor device after calculation at each processing block is lost. The loss of the fractional part of the data is magnified when the data is amplified. The accumulated errors are magnified at the digital gain when the data is "G"-time amplified during the "Digital Gain" procedure in the image processing. Typically the digital gain, G, can be 8 or 16. The image quality of the image sensor device is noticeable at even the second or third least significant bits (LSB) of the digital data.

Figure 2:
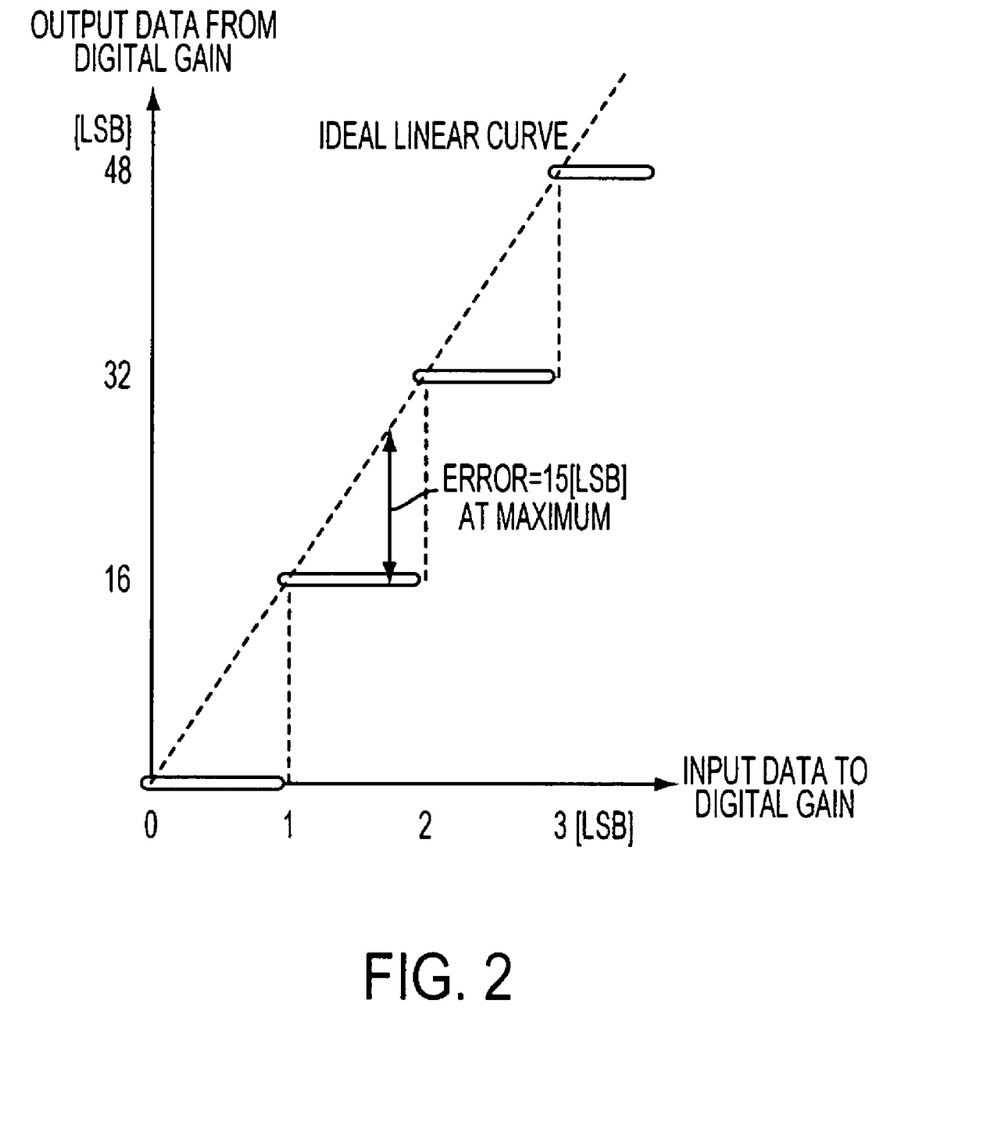
FIG. 2 illustrates the error for the conventional image processing data-path compared to the ideal data path.

FIG. 2 illustrates the error produced by the data-path for image processing with 16-time amplifying, G according to FIG. 1. As can be seen from the figure, the error in the data path according to FIG. 1 is the difference between the output from digital gain (horizontal lines) and the ideal linear curve. FIG. 2 shows the difference between "G*x" and "integer part of G*x" where x is input data to Digital Gain. The scale of the y-axis is for 16-time amplifying.

There is a need, therefore, for imaging devices which have improved image quality. A method of reducing computational errors in the image processing data paths of an image sensor device is also needed.

BRIEF SUMMARY OF THE INVENTION

The present invention provides an imager method and apparatus for reducing error in the image processing data path of an image sensor device.

The present invention provides an imager device having a necessary minimum bus bit width in the image processing data-path. The invention provides an imager method and apparatus having a high accuracy output irrespective of the digital gain value. The present invention provides an imager device that can be adopted for all sensors which have column fixed pattern noise correction and digital gain in their data-path.

Additional advantages and features of the present invention will be apparent from the following detailed description and drawings which illustrate preferred embodiments of the invention.

DETAILED DESCRIPTION OF THE INVENTION

In the following detailed description, reference is made to the accompanying drawings, which form a part hereof and show by way of illustration specific embodiments in which the invention may be practiced. These embodiments are described in sufficient detail to enable those skilled in the art to practice the invention, and it is to be understood that other embodiments may be utilized, and that structural, logical, and electrical changes may be made without departing from the spirit and scope of the present invention. The progression of processing steps described is exemplary of embodiments of the invention; however, the sequence of steps is not limited to that set forth herein and may be changed as is known in the art, with the exception of steps necessarily occurring in a certain order.

Also, while the invention is described with reference to a CMOS imager, it should be appreciated that the invention may be applied in the digital data path of any other type of imager or in the data path of any micro-electronic or micro-optical device that requires low noise for optimized performance.

Referring now to the drawings, where like elements are designated by like reference numerals.

Figure 3:
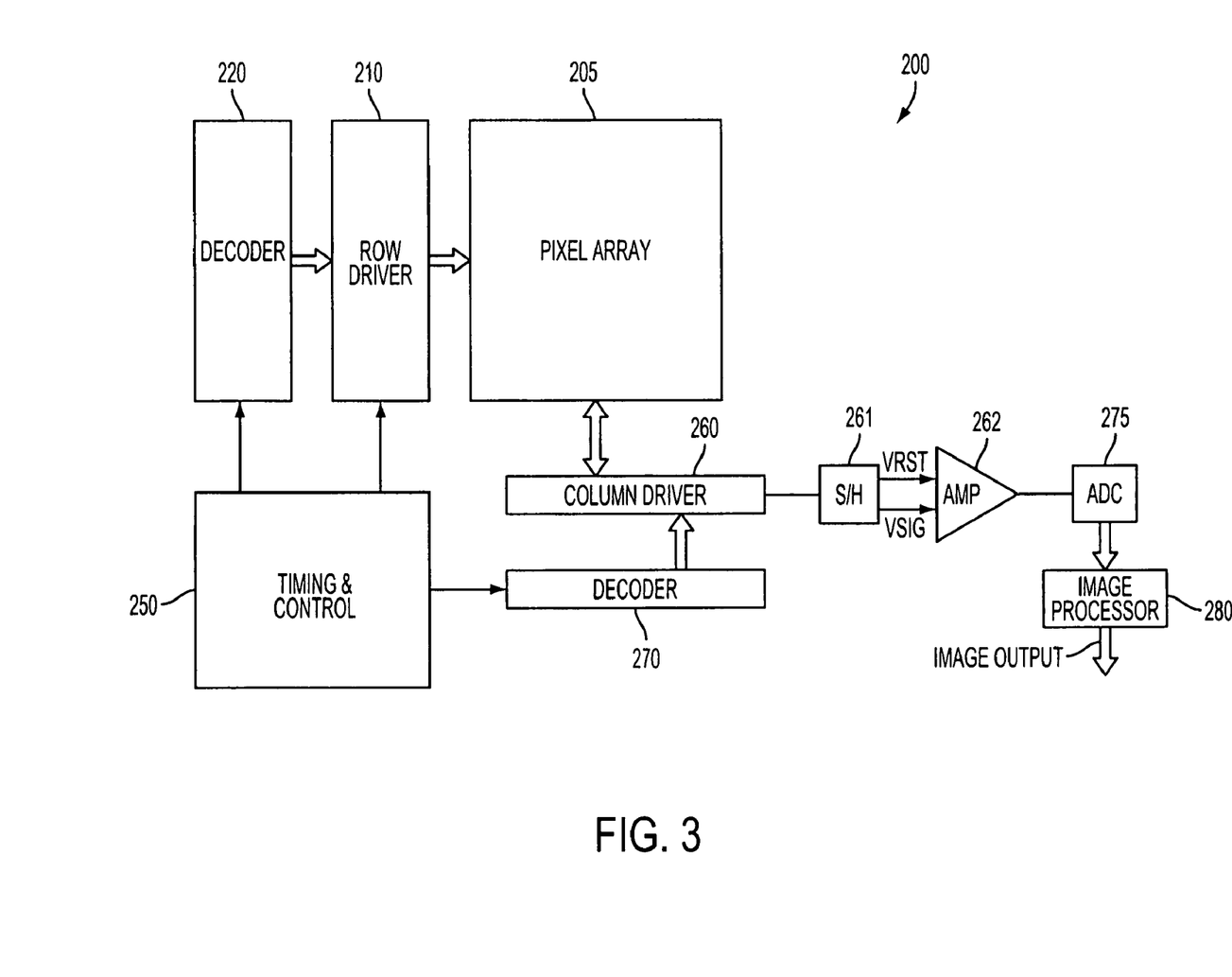
FIG. 3 illustrates an imager constructed in accordance with an embodiment of the invention.

Reference is now made to FIG. 3 which illustrates an exemplary CMOS imager 200 that may utilize any embodiment of the invention. The imager 200 has a pixel array 205 comprising pixel cells as understood by the person having ordinary skill in the art. Row lines are selectively activated by a row driver 210 in response to row address decoder 220. A column driver 260 and column address decoder 270 are also included in the imager 200. The imager 200 is operated by the timing and control circuit 250, which controls the address decoders 220, 270. The control circuit 250 also controls the row and column driver circuitry 210, 260.

A sample and hold (S/H) circuit 261 associated with the column driver 260 reads a pixel reset signal Vrst and a pixel image signal Vsig for selected pixel cells. A differential signal (Vrst−Vsig) is amplified by differential amplifier (AMP) 262 for each pixel and is digitized by analog-to-digital converter 275 (ADC). The analog-to-digital converter 275 supplies the digitized pixel signals to an image processor 280, which forms a digital image.

Figure 4:
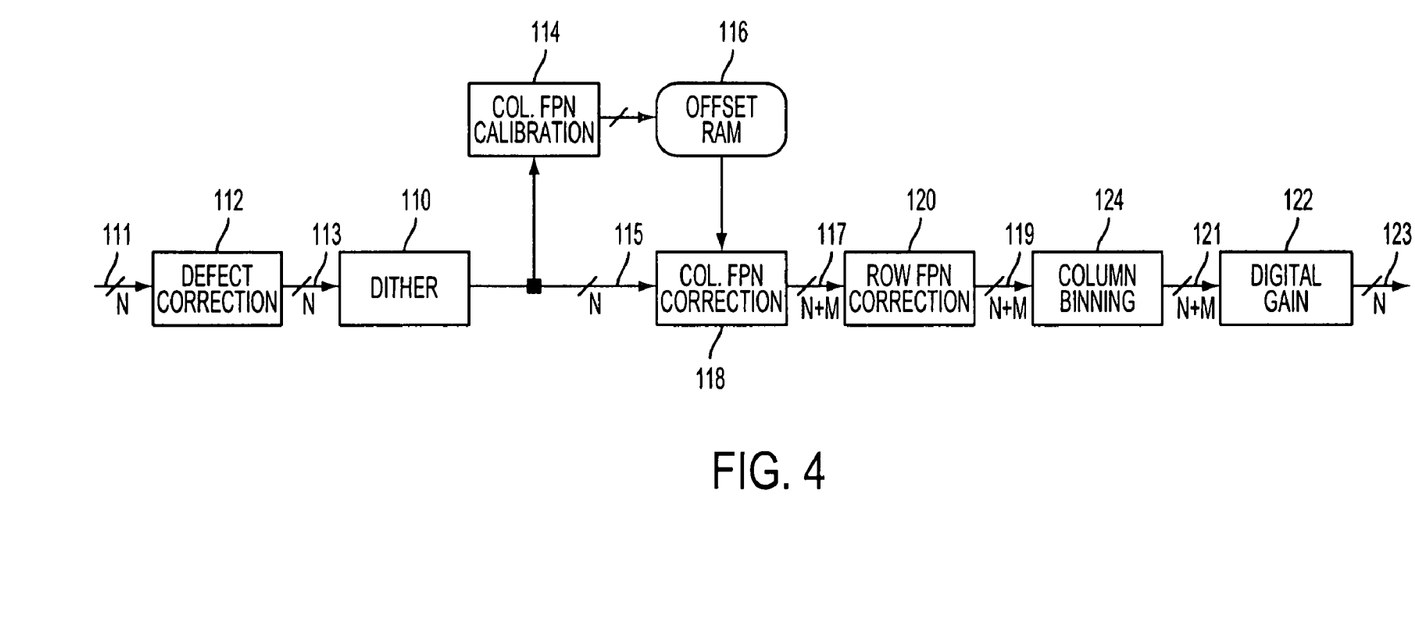
FIG. 4 illustrates a schematic illustration of an image processing data-path according to an exemplary embodiment of the present invention.

Within the image processor 280, which may be in the form of hardware, software or a mixture of the two, is an image processor data path. Reference is now made to FIG. 4 which is an illustration of an image processing data-path according to an exemplary embodiment of the present invention. As can be seen from the figure, after analog-to-digital conversion, digital image data is received over an N-bit wide data path 111 and is forwarded to a defect correction processing block 112 where any defects in the digital image data are corrected. As set forth above, the defect correction substitutes pixel defects (i.e., single dark or bright pixels) with neighboring pixel data to correct any defects in the pixel data.

The data is then sent via an N-bit wide data path 113 to a dithering processing block 110. Once dithered, the data is then forwarded to a column fixed pattern noise correction processing block 118 via N-bit wide data path 115. Any column fixed pattern noise in the image data is compared to a column fixed pattern calibration values 114 which have been stored in an offset RAM 116, at the column fixed pattern noise correction processing block 118. The data is then sent to the row fixed pattern noise correction processing block 120 over N+M-bit wide data path 117. The data is next sent to a column binning processing block 124 over N+M-bit wide data path 119. After binning, the data is next sent to the digital gain step 122 over N+M-bit wide data path 121, where a digital gain is applied. Finally, the data is output over an N-bit wide data path 123.

The enhanced M-bit portion in the N+M-bit wide data paths 117, 119, and 121 represents a fractional part of the image data which, in the prior art, was truncated or discarded. As discussed below, "M" is calculated by a mathematical expression and the N+M-bit wide data paths 117, 119, and 121 enable the image processor 280 to limit the computation error within 1 LSB, even when maximum digital gain is applied.

For every image sensor device, digital gain is an indispensable function. Moreover, column fixed pattern noise correction is a necessary function, especially for column parallel sensors. Column fixed pattern noise correction corrects column to column offsets which come from the small difference between the levels of the gain amplifiers and ADCs. Without the correction, the image may have vertical stripes caused by noise.

However, column fixed pattern noise correction uses offset data having the fractional portion of the image data, but the conventional column fixed pattern noise correction (FIG. 1, 18) outputs only an integer portion of the data. Therefore, the conventional column fixed pattern noise correction creates a source of error. This error is compounded when the data undergoes digital gain. The amount of error is dependent upon the amount of truncation of the fractional portion of the data from the column fixed pattern noise correction.

Before the correction, each column offset value is calibrated by the column fixed pattern noise calibration processing block 114, and stored in offset RAM 116. The column fixed pattern noise calibration processing block 114 samples known level data multiple times (because the accumulation of the sampled data provides precise averages depending on the number of sampling). It is known that the error follows $1/\sqrt{(X)}$ in X-time sampling.

For example, 16-time sampling provides an average value which has 2 bits after the decimal point.

$$\text{Error} < 1/\sqrt{(16)}$$

When the column fixed pattern noise calibration processing block 14 samples known level data 128 times, the conventional data-path structure (FIG. 1) loses up to 3 bits of correct data due to truncation of data after the decimal point at the column fixed pattern correction processing block 18. The data loss is mainly due to truncation of the data bits, which are subsequently processed through a digital gain stage 22 and which can create a large computation error due to the digital gain.

In contrast to applying digital gain to the data before applying the column fixed pattern noise correction, which requires significant additional memory to store the gained data, the structure according to the present invention does not require extra memory.

The additional M data bits in the N+M-bit wide data paths 117, 119, and 121 are defined as:

$$M = \text{int}(\log_2(G_{max})) + C$$

Where $\text{int}(\log_2(G_{max}))$ is the integer part of $(\log_2(G_{max}))$, $G_{max}$ is the maximum gain at the digital gain step 122 and C is the calculation margin, which depends on the process in the bus-extended area. According to the present invention, for an image sensor having digital gain up to 8 times the original value, with C set to 1, M is 4. While a larger bit width M doesn't create problems for the accuracy of the output, a smaller M, but necessary size for processing, for the particular image sensor is preferable due to the area increase. That is, it would not be feasible to merely create uniform large bit width bus lines for every data path in the imager device as it would make the underlying device too large.

To make the final error less than 1 LSB, the number of samples in the column fixed pattern noise calibration has a lower limit $X_{min}$. The minimum sampling "$X_{min}$" is defined as follows.

$$X_{min} = 4^{Mmin},$$

where $M_{min} = \text{int}(\log_2(G_{max}))$

Figure 5:
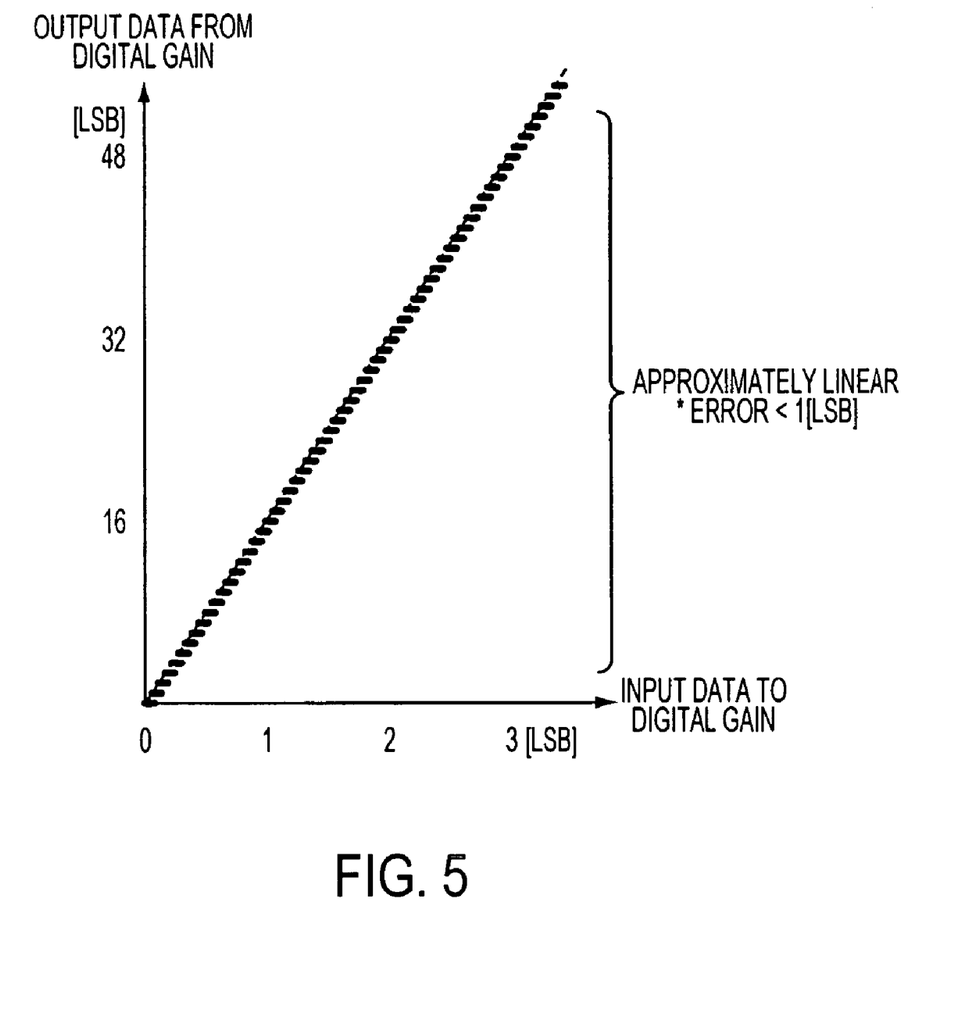
FIG. 5 illustrates the error for the image processing data-path according to an exemplary embodiment of the present invention compared to the ideal data path.

FIG. 5 illustrates the error for the data-path for image processing with an additional 4-bit bus portion (M=4) for 16 time amplifying of digital gain, G. As can be seen from the figure, the error is the difference between the output from digital gain and the ideal linear curve. FIG. 5 shows the difference between "G*x" and "integer part of G*x" where x is input data to Digital Gain. The scale of the y-axis is for 16-time amplifying.

Figure 6:
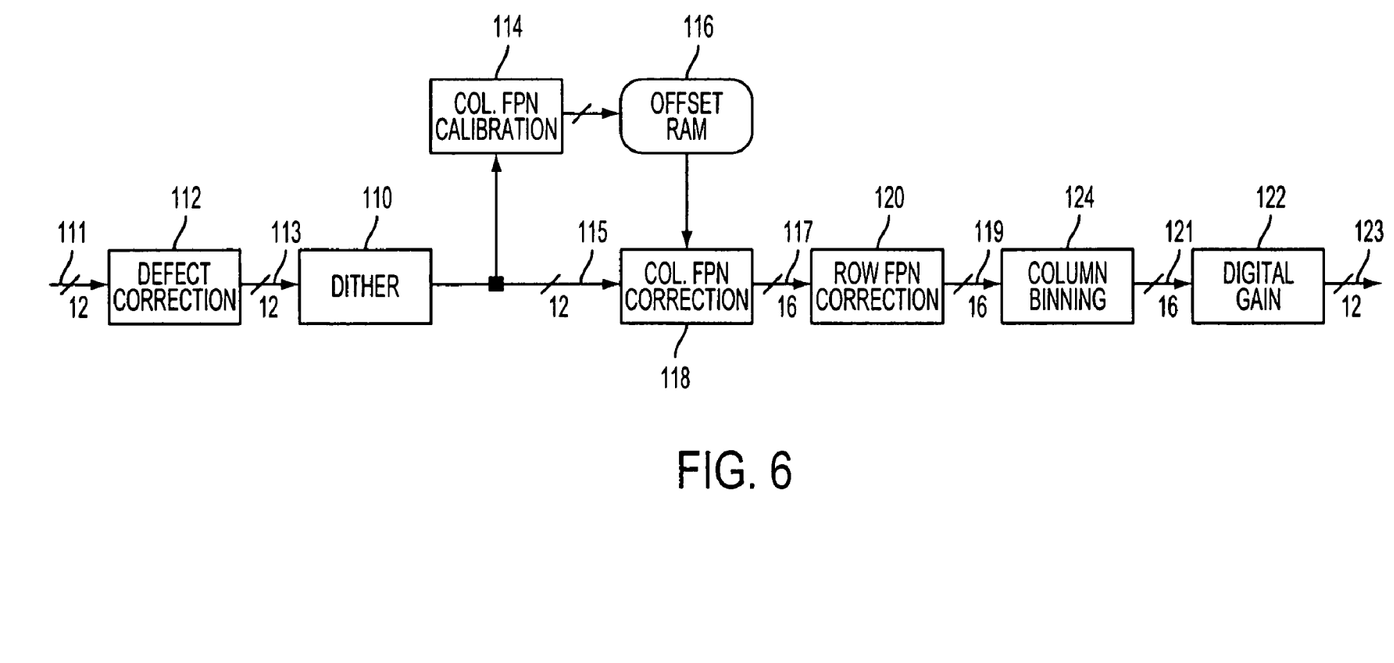
FIG. 6 illustrates an illustration of an image processing data-path according to an exemplary embodiment of the present invention.

Reference is now made to FIG. 6, which shows an exemplary embodiment according to the present invention. In FIG. 6, the additional data bit M in the N+M-bit wide data paths 117, 119, 121 is 4, meaning that bus data paths 117, 119, and 121 are 16 bit paths while data paths 111, 113, and 115 are 12 bit data paths.

Figure 7:
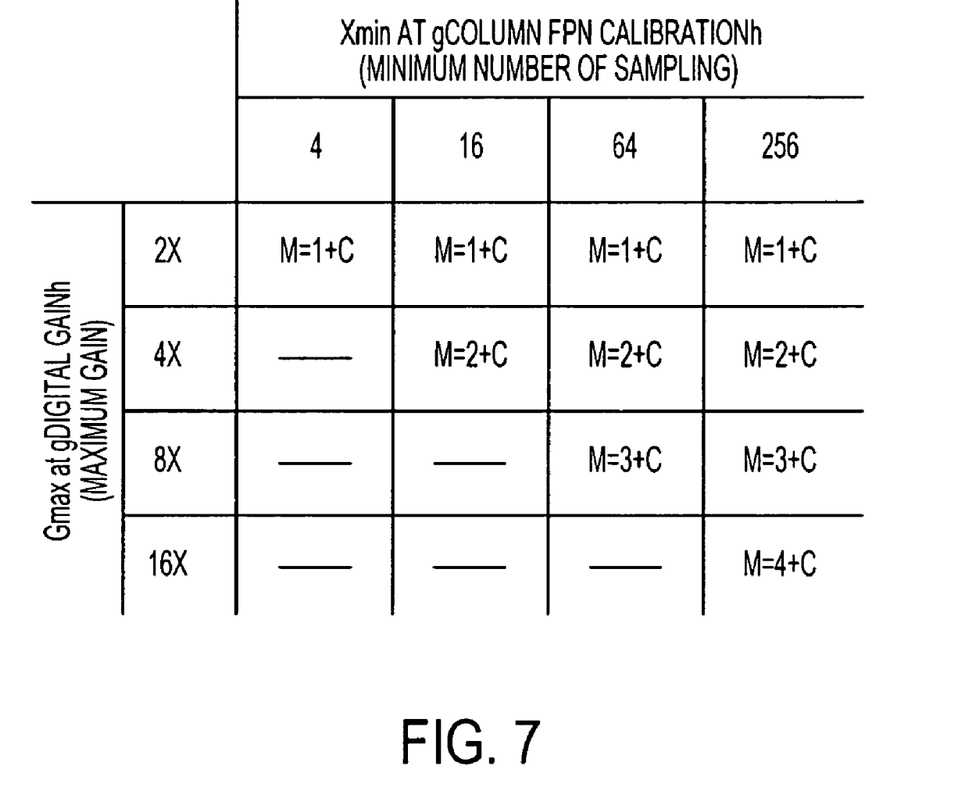
FIG. 7 is a table showing the relationship between $G_{max}$, $X_{min}$ and M according to an exemplary embodiment of the present invention.

FIG. 7 shows the relation among $G_{max}$, $X_{min}$ and M. In the figure, the mark " - - - " means that the combination can not make an error less than 1 LSB, and C is the calculation margin.

Figure 8:
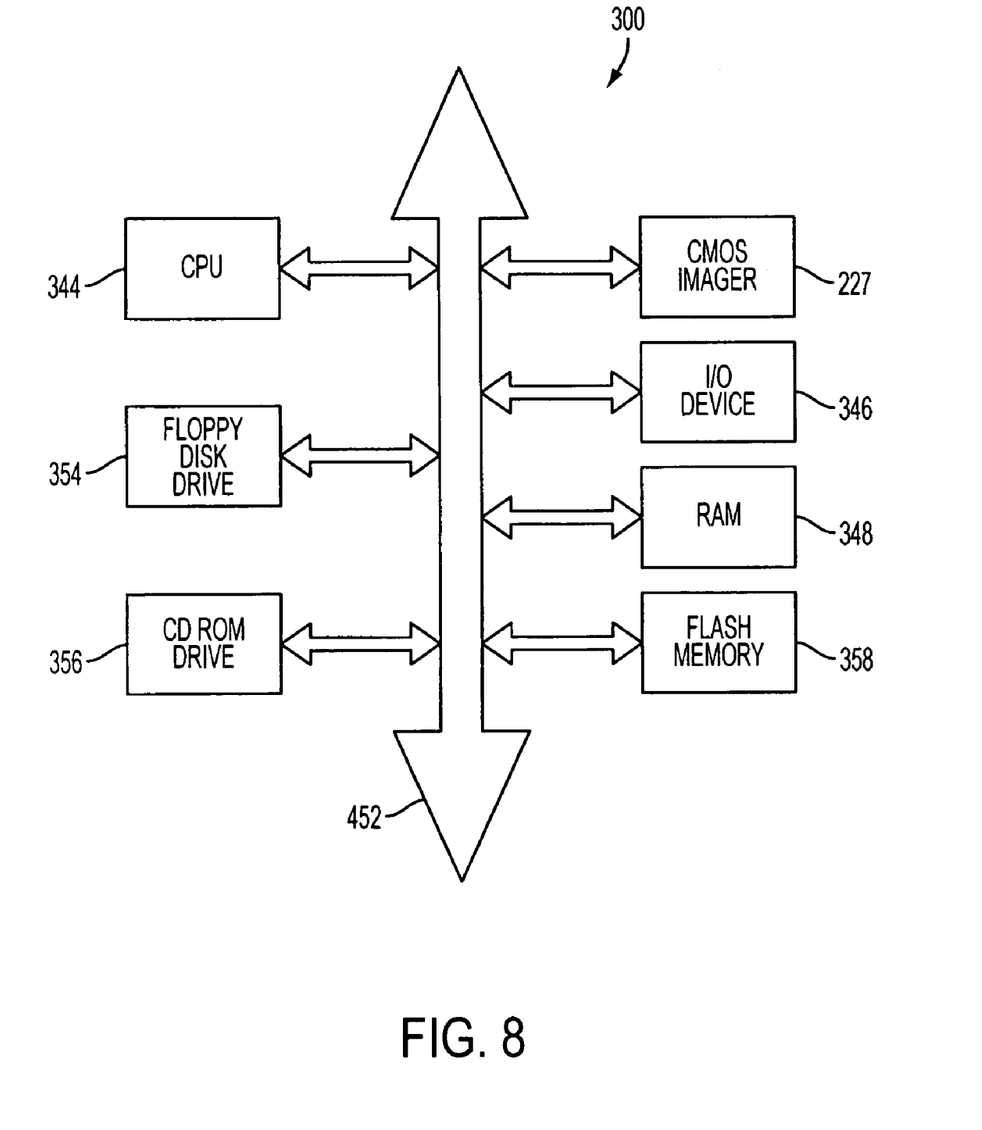
FIG. 8 is an illustration of an imaging system having an imager with a variable data bus path according to an exemplary embodiment of the present invention.

An exemplary processor system 300 using a CMOS imager 227 having an image processing path in accordance with the present invention is illustrated in FIG. 8. A processor based system is exemplary of a system having digital circuits which could include CMOS or other imager devices. Without being limiting, such a system could include a computer system, camera system, scanner, machine vision system, vehicle navigation system, video telephone, surveillance system, auto focus system, star tracker system, motion detection system, image stabilization system and other image processing systems.

As shown in FIG. 8, an exemplary processor system 300, for example, a camera generally comprises a central processing unit (CPU) 344, e.g., a microprocessor, that communicates with an input/output (I/O) device 346 over a bus 452. The imager 227, which includes a data path constructed in accordance with the present invention, also communicates with the system over bus 452. The processor system 300 also includes random access memory (RAM) 348, and may include peripheral devices such as a floppy disk drive 354, a compact disk (CD) ROM drive 356 or a removable memory such as a flash memory 358, which also communicate with CPU 344 over the bus 452. The floppy disk 454, the CD ROM 356 or flash memory 358 stores images captured by imager 227.

While the invention has been described in detail in connection with exemplary embodiments known at the time, it should be readily understood that the invention is not limited to such disclosed embodiments. Rather, the invention can be modified to incorporate any number of variations, alterations, substitutions or equivalent arrangements not heretofore

What is claimed as new and desired to be protected by Letters Patent of the United States is:

1. An imager processor system comprising:
an image sensor including an array of pixel sensor cells;
a processor having image processing stages for receiving and processing data representing an image from said pixel sensor cells, wherein said processor has a bus having a varied bit width between image processing stages;
wherein said bus has an N bit width between a pair of adjacent processing stages, and an N+M bit width between at least another pair of adjacent processing stages, where N is defined by the resolution of an analog-to-digital converter in the image sensor device and $$M=\mathrm{int}(\log_2(G_{max}))+C$$

where $G_{max}$ is the maximum digital gain of a gain stage of the processor and C is a calculation margin.

2. An imager processor system comprising:
an image sensor including an array of pixel sensor cells;
a processor for receiving and processing data representing an image from said pixel sensor cells, wherein said processor having a plurality of data processing stages and a first data bus interconnecting said stages which has a first bit width between two adjacent stages which is different from a second bus between another two adjacent stages having a second bit width;
wherein said first bus has bit width N and said second bus has a bit width N+M, where N is defined by the resolution of an analog-to-digital converter in the image sensor device and $$M=\mathrm{int}(\log_2(G_{max}))+C$$

where $G_{max}$ is the maximum digital gain of a gain stage of the processor and C is a calculation margin.

3. An image processor circuit comprising:
a defect correction stage;
a dithering stage;
a column fixed pattern noise stage;
a row fixed pattern noise stage;
a digital gain stage; and
a column binning stage, wherein the bus bit width between said dithering stage, said defect correction stage and said column fixed pattern noise stage has a bus bit width N, where N is defined by the resolution of an analog-to-digital converter in an image sensor device, and the bus bit width between said column fixed pattern noise stage, said row fixed pattern noise stage, and said digital gain stage has an N+M bit width, where M>1.

4. The image processing circuit according to claim 3, where M is:

$$M=\mathrm{int}(\log_2(G_{max}))+C$$

where $G_{max}$ is the maximum digital gain employed in said digital gain stage and C is a calculation margin.

5. The image processing circuit according to claim 3, wherein in said bus having an N+M bit width, the N bit width bus portion carries integer data from the column fixed pattern noise correction stage and the M bit width portion carries the fractional data from the column fixed pattern noise correction stage.

6. The image processing circuit according to claim 5, further comprising a column fixed pattern noise calibration stage.

7. The image processing circuit according to claim 5, wherein when the resolution of the analog-to-digital converter in the image sensor device is a 12-bit resolution, and the N+M bus portion is a 16-bit bus.

8. The image processing circuit according to claim 3, wherein said defect correction stage is before said dithering stage and said defect correction stage and said dithering stage are connected by a bus having an N bit width.

9. The image processing circuit according to claim 8, wherein said dithering stage is before said column fixed pattern noise stage and said dithering stage and said column fixed pattern noise stage are connected by a bus having an N bit width.

10. The image processing circuit according to claim 9, wherein said column fixed pattern noise stage is before said row fixed pattern noise stage and said column fixed pattern noise stage and said row fixed pattern noise stage are connected by a bus having an N+M bit width.

11. The image processing circuit according to claim 10, wherein said row fixed pattern noise stage is before said column binning stage and said row fixed pattern noise stage and said column binning stage are connected by a bus having an N+M bit width.

12. The image processing circuit according to claim 11, wherein said column binning stage is before said digital gain stage and said column binning stage and said digital gain stage are connected by a bus having an N+M bit width.

13. The image processing circuit according to claim 12, further comprising a data output bus having an N bit width.

14. The image processing circuit according to claim 13, further comprising a column fixed pattern noise calibration stage.

15. The image processing circuit according to claim 13, wherein when the resolution of the analog-to-digital converter is a 12-bit resolution, the bus having an N+M bit width is a 16-bit bus.

16. A method for reducing image computation error in an image processing circuit, said method comprising:
providing an image processing circuit having a variable data bus bit width within an image processing data path;
correcting pixel defects in a pixel defect correction step;
dithering image data in a dithering step;
correcting for column fixed pattern noise in a column fixed pattern noise step;
correcting for row fixed pattern noise in a row fixed pattern noise step;
applying a digital gain to the image data in a digital gain step; and
binning the image data in a column binning step, wherein the bus bit width between said dithering step, said pixel defect correction step and said column fixed pattern noise step has an N bus bit width, where N is defined by the resolution of an analog-to-digital converter in an image sensor device, and the bus bit width between said a column fixed pattern noise step, said row fixed pattern noise step, and said digital gain step has an N+M bit width, where M>1.

17. The method according to claim 16, wherein $$M=\mathrm{int}(\log_2(G_{max}))+C$$

where $G_{max}$ is the maximum digital gain employed in said digital gain step and C is a calculation margin.

18. The method according to claim 16, wherein in said bus having an N+M bit width, the N bit width bus carries the integer portion of the data from the column fixed pattern noise correction step and the M bit width carries the fractional data portion of the data from the column fixed pattern noise correction step.

19. The method according to claim 18, wherein said imager processing step further comprises a column fixed pattern noise calibration step.

20. The method according to claim 18, wherein when the resolution of an analog-to-digital converter in an image sensor device is a 12-bit resolution, the bus having an N+M bit width is a 16-bit bus.

21. The method according to claim 16, comprising providing an image processing step wherein said pixel defect correction step is before said dithering step and said pixel defect correction step and said dithering step are connected by a bus having an N bit width.

22. The method according to claim 21, comprising providing an image processing step wherein said dithering step is before said column fixed pattern noise step and said dithering step and said column fixed pattern noise step are connected by a bus having an N bit width.

23. The method according to claim 22, comprising providing an image processing step wherein said column fixed pattern noise step is before said row fixed pattern noise step and said column fixed pattern noise step and said row fixed pattern noise step are connected by a bus having an N+M bit width.

24. The method according to claim 23, comprising providing an image processing step wherein said row fixed pattern noise step is before said column binning step and said row fixed pattern noise step and said column binning step are connected by a bus having an N+M bit width.

25. The method according to claim 24, comprising providing an image processing step wherein said column binning step is before said digital gain step and said column binning step and said digital gain step are connected by a bus having an N+M bit width.

26. The method according to claim 25, further comprising providing a data output bus having an N bit width.

27. The method according to claim 26, further comprising providing a column fixed pattern noise calibration step.

28. The method according to claim 27, comprising providing an image processing step wherein when the resolution of an analog-to-digital converter in an image sensor device is a 12-bit resolution, the bus having an N+M bit width is a 16-bit bus.

* * * * *